United States Patent
Saunders et al.

(10) Patent No.: US 10,632,431 B2
(45) Date of Patent: Apr. 28, 2020

(54) HELICAL BLADE BEATER MIXER

(71) Applicant: Spectrum Brands, Middleton, WI (US)

(72) Inventors: James Stuart Saunders, Madison, WI (US); Rolando Antonio Cavazos Jimenez, Middleton, WI (US); Aaron Layton Brunner, Whitewater, WI (US); Joseph Valdon Krebs, Madison, WI (US)

(73) Assignee: Spectrum Brands, Inc., Middleton, WI (US)

( * ) Notice: Subject to any disclaimer, the term of this patent is extended or adjusted under 35 U.S.C. 154(b) by 3 days.

(21) Appl. No.: 15/440,969

(22) Filed: Feb. 23, 2017

(65) Prior Publication Data
US 2017/0252710 A1    Sep. 7, 2017

Related U.S. Application Data

(60) Provisional application No. 62/301,783, filed on Mar. 1, 2016.

(51) Int. Cl.
*A47J 43/07* (2006.01)
*B01F 7/24* (2006.01)
(Continued)

(52) U.S. Cl.
CPC ....... *B01F 7/00441* (2013.01); *A47J 43/0711* (2013.01); *B01F 7/0015* (2013.01);
(Continued)

(58) Field of Classification Search
CPC .... B01F 7/0015; B01F 7/00391; B01F 7/004; B01F 7/00408; B01F 7/00416;
(Continued)

(56) References Cited

U.S. PATENT DOCUMENTS 116,855 A * 7/1871 Monfort .................. B01F 7/166
261/87
661,207 A * 11/1900 Carter ...................... A01C 1/08
366/183.2
(Continued)

FOREIGN PATENT DOCUMENTS

DE     4440566     11/1995
FR     2058049     5/1971
(Continued)

OTHER PUBLICATIONS

EPO Translation of FR2058049. pp. 1-2. Retrieved Sep. 5, 2018. (Year: 1971).*
(Continued)

*Primary Examiner* — Charles Cooley
(74) *Attorney, Agent, or Firm* — Kagan Binder, PLLC

(57) ABSTRACT

A helical blade body attachable to a food mixer by a shaft, the helical blade body formed from at least three helical blade members each of which has a first end connecting with a cap portion and a second end connecting with a base portion for creating a mixing zone within the helical blade body, each of the helical blade members having a spiraled configuration and extending from the cap portion to the base portion, wherein each of the helical blade members have the spiral angled in the same rotational direction, and wherein each of the helical blade members comprises a leading edge and a trailing edge with an upward facing spiraled flat surface in between with a predefined width and thickness so that during rotation of the blade body in a select rotational direction the spiraled flat surface will urge product being mixed upward, and wherein each helical blade is formed integrally with the cap portion and the base portion of a high strength plastic material. The unique shape of the helical beater described herein not only achieves higher mixing performance but also power efficiency. By using high (Continued)

strength plastics instead of metal, the improved helical beater design described herein will lower or fix material and manufacturing costs and will provide a better method of controlling the geometry of the beater body.

7 Claims, 2 Drawing Sheets

(51) Int. Cl.
   *B01F 7/00* (2006.01)
   *B01F 7/16* (2006.01)
   *B01F 15/00* (2006.01)

(52) U.S. Cl.
   CPC ........ *B01F 7/00391* (2013.01); *B01F 7/1665* (2013.01); *B01F 7/241* (2013.01); *B01F 15/0048* (2013.01); *B01F 15/00538* (2013.01); *B01F 2015/00603* (2013.01)

(58) Field of Classification Search
   CPC .............. B01F 7/00425; B01F 7/00433; B01F 7/00441; B01F 7/1665; B01F 7/241; B01F 15/0048; B01F 15/00538; B01F 2015/00603; A47J 43/0711
   USPC .......................................... 366/301, 310, 320
   See application file for complete search history.

(56) References Cited

U.S. PATENT DOCUMENTS

| | | | |
|---|---|---|---|
| 2,515,713 A | 6/1949 | Johnson et al. | |
| 2,538,877 A * | 1/1951 | McCloy | A47J 43/0711 366/200 |
| 2,577,896 A * | 12/1951 | Kinton | B01F 7/00416 416/199 |
| 2,761,657 A * | 9/1956 | Rietz | F28D 11/02 165/169 |
| 3,154,297 A * | 10/1964 | Lovgren | A47J 43/0711 366/343 |
| 3,314,660 A * | 4/1967 | Arbiter | A47J 43/044 366/142 |
| 3,656,718 A | 4/1972 | Cairelli | |
| 4,311,397 A | 1/1982 | Wright | |
| 5,275,513 A | 1/1994 | Geary, Jr. et al. | |
| 5,520,458 A * | 5/1996 | Arutyunov | B01F 7/00583 366/262 |
| 5,549,384 A * | 8/1996 | Reynolds | B01F 7/161 366/143 |
| 5,683,178 A | 11/1997 | Nakamoto et al. | |
| 5,906,432 A | 5/1999 | Wade et al. | |
| 6,179,458 B1 * | 1/2001 | Albers | B01F 7/00 366/150.1 |
| 6,273,601 B1 * | 8/2001 | Hlavka | B01F 7/08 366/129 |
| 6,652,137 B1 | 11/2003 | Bosch et al. | |
| 6,955,110 B1 * | 10/2005 | Spletzer | A22C 17/0006 241/260.1 |
| 8,267,573 B2 * | 9/2012 | Wilson | A47J 43/0711 366/200 |
| 8,714,807 B2 * | 5/2014 | Obersteiner | A47J 43/0711 366/129 |
| 9,060,651 B2 * | 6/2015 | Filipitsch | B01F 7/00583 |
| 2005/0281130 A1 | 12/2005 | Hsieh | |
| 2006/0158960 A1 * | 7/2006 | Wu | B01F 3/1221 366/288 |
| 2011/0116341 A1 | 5/2011 | Obersteiner | |
| 2012/0113741 A1 | 5/2012 | Filipitsch et al. | |
| 2017/0252710 A1 * | 9/2017 | Saunders | B01F 7/00441 |

FOREIGN PATENT DOCUMENTS

| | | | |
|---|---|---|---|
| WO | 2009079682 | 7/2009 | |
| WO | 2013188925 | 12/2013 | |
| WO | WO-2018206710 A1 * | 11/2018 | .......... B01F 7/00141 |

OTHER PUBLICATIONS

International Search Report and Written Opinion for International application No. PCT/US2017/019107 dated Jun. 20, 2017 (13 pages).

* cited by examiner

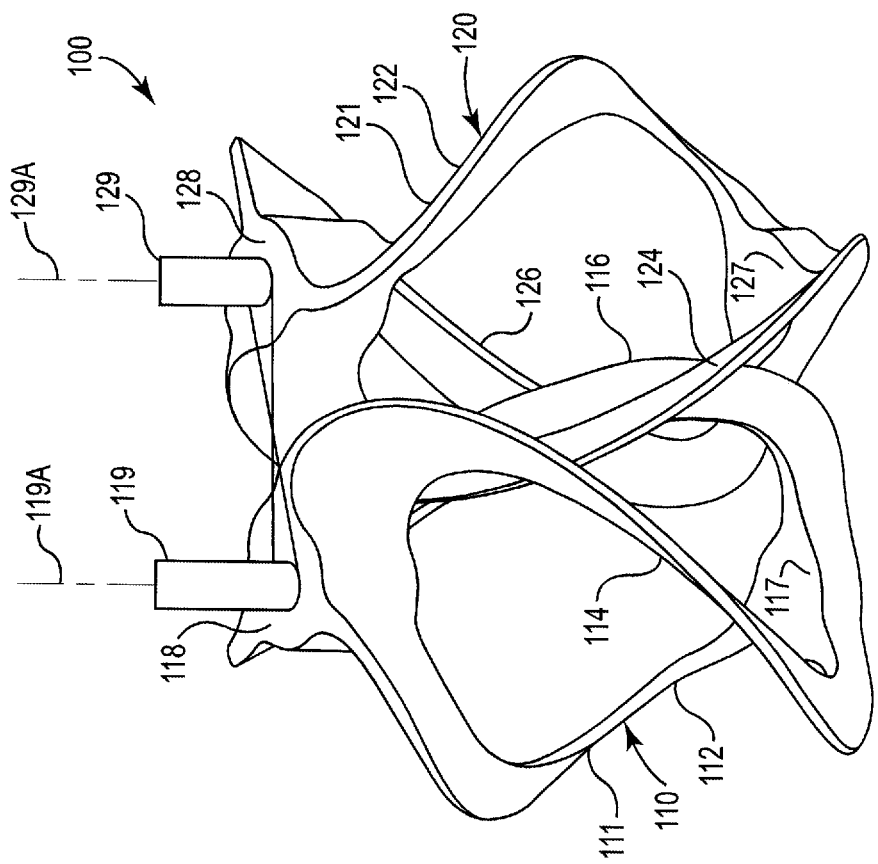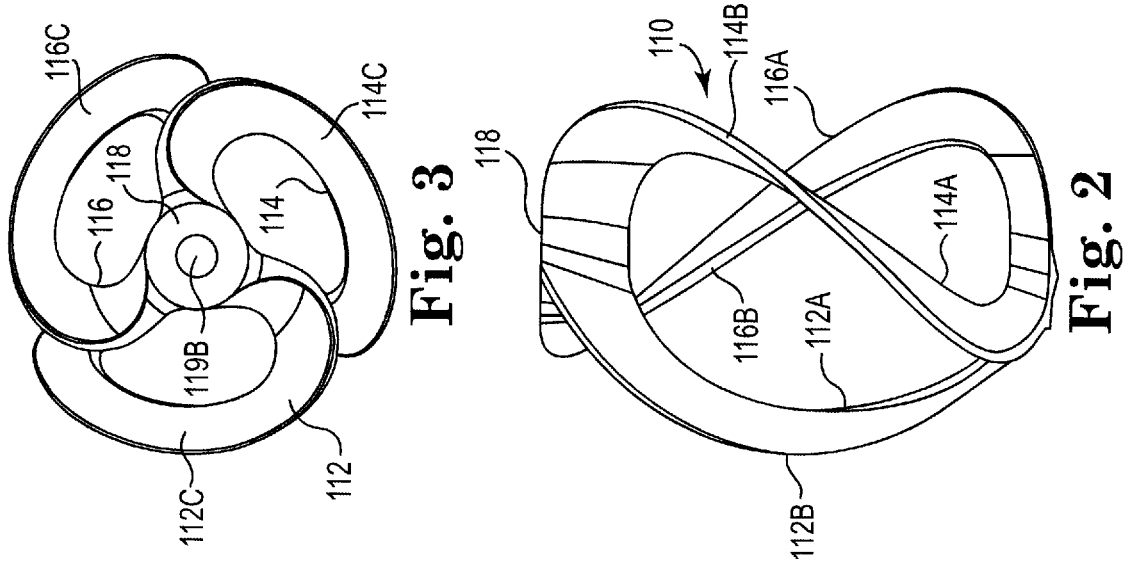

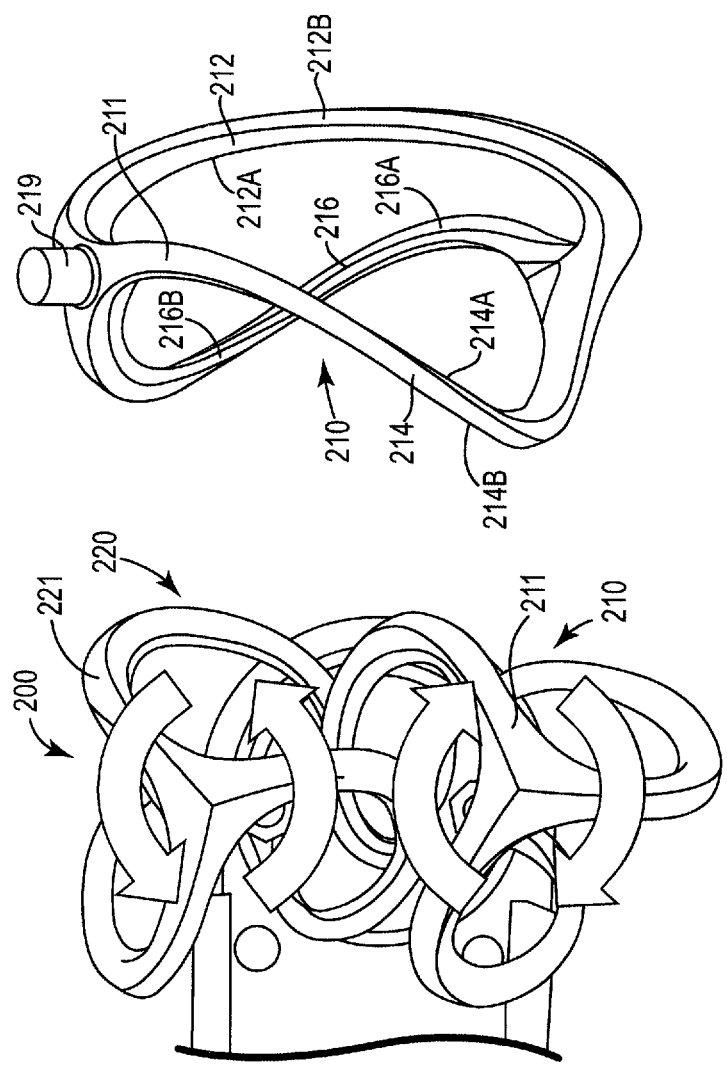
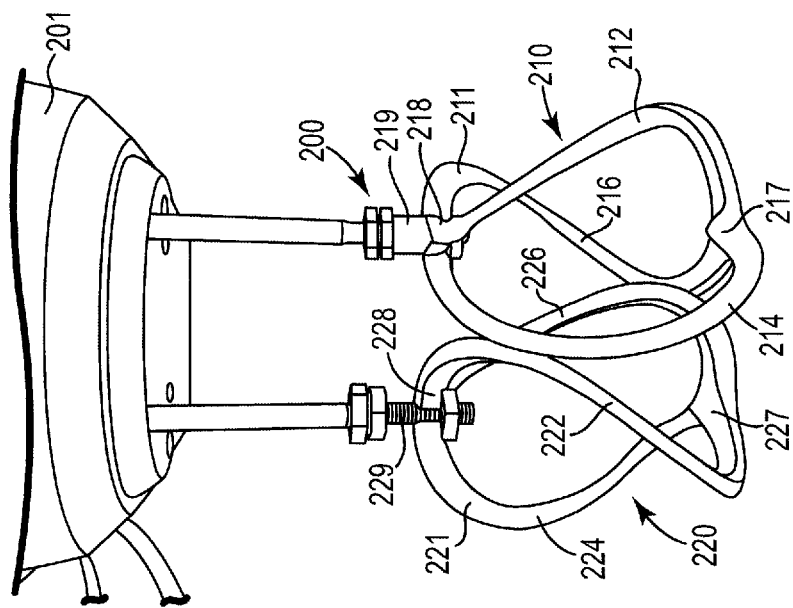
Fig. 6
Fig. 5
Fig. 4

HELICAL BLADE BEATER MIXER

CLAIM OF PRIORITY

This application claims priority to and the benefit of a U.S. Provisional Application with Ser. No. 62/301,783, filed on Mar. 1, 2016, which is incorporated herein by reference in its entirety.

FIELD AND BACKGROUND OF THE INVENTION

The invention described herein relates to beater and mixer blades.

Planetary mixers, which include at least one stirrer (or mixing blade) that revolves (or orbits) in a mixing vessel (or tank) about a central axis while simultaneously revolving on its own axis, have an advantage over regular handheld mixers or blenders in that they move the stirrer or stirrers through all areas of the mixing vessel and are especially useful when mixing high viscosity mixtures which cannot be adequately mixed with a mixer or blender having a fixed stirrer. Planetary mixers usually have stirrers that are mounted on a drive mechanism which includes means for lifting the stirrers out of the mixing vessel. The most commonly known planetary mixer is the type that is typically found in kitchens for mixing dough and various food products, having a single stirrer and somewhat hemispherical bottom mixing bowl. Such stirrers have certain drawbacks such as not having good top to bottom mixing capability, therefore making it necessary to increase the mixing time in order to get a homogeneous mix. Overcoming some of these problems in blenders and mixers can require a heavier duty drive system, which in turn increases the cost of the machine.

A crossbar is sometimes located at the bottom of the stirrer or beater but it is primarily for strengthening the stirrer rather than for any mixing action. The crossbar however causes undue strain on the beater or mixer motor because of the high side loads that they produce at the farthest point away from the motor and drive as well as the additional torque required to rotate the bottom crossbar in high viscosity materials. The presence of a crossbar or a larger bottom portion of the beater limit the ability of the beater or mixer to mix high viscosity materials. In order to mix high viscosity materials and overcome some of these challenges current beater designs use expensive materials or complex configurations that unfortunately also create a high load on the motor.

SUMMARY

The unique shape of the helical beater described herein not only achieves higher mixing performance but also power efficiency. By using high strength plastics instead of metal, the improved helical beater design described herein will lower or fix material and manufacturing costs and will provide a better method of controlling the geometry of the beater body.

In one example embodiment, there is provided a beater or mixer member including a shaft having a longitudinal axis and a helical blade body attached to an end of the shaft at a cap portion of the helical blade body. The helical blade body is formed from at least three helical blade members each of which has a first end secured at the cap portion and a second end secured at a base portion, each of the helical blades having a spiraled configuration and extending from the cap portion to the base portion, wherein each of the helical blades have the spiral angled in the same direction and the blades are located equidistant from each other.

In a related example embodiment, there is provided a beater member assembly that includes at least two beater members as disclosed herein, wherein a first beater member and a second beater member are located adjacent each other and their respective shafts are parallel to each other, and wherein the helical blade body of each of the beater members are located in an interleaving and a phase adjusted relationship to define a mixing zone between the shafts and helical blade bodies. In this example beater member assembly, the helical blade bodies are configured to rotate in opposite directions to form the mixing zone.

In yet another related embodiment, there is provided a beater or mixer system that includes either a beater member or a beater member assembly as described herein and further includes a housing and a motor and a motor drive with a clutch member within the housing. In this example embodiment, the beater member has a clutch element on an upper end of the shaft engageable with the clutch member within the housing interconnecting the shaft and the motor to rotate the shaft. The beater system also includes a first beater member and a second beater member that are located adjacent each other and their respective shafts are parallel to each other, and wherein the helical blade body of each of the beater members are located in an interleaving and a phase adjusted relationship to define a mixing zone between the shafts and helical blade bodies. The driving mechanism of the beater system described herein rotates the shafts in opposite directions to move ingredients between the beater members within the mixing zone.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DESCRIPTION OF THE DRAWINGS

FIG. 1 illustrates a perspective view of a two beater member assembly according to the teachings herein;

FIG. 2 illustrates a side view of a helical beater member according to the teachings herein;

FIG. 3 illustrates a top view of a helical beater member according to the teachings herein;

FIGS. 4 and 5 illustrate front and bottom views of another example embodiment of a two beater member assembly according to the teachings herein; and FIG. 6 illustrates a side view of another example embodiment of a helical beater member according to the teachings herein.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

The various embodiments of the invention are directed to a new helical twin blade mixer design, wherein each individual blade includes a triple helix, the two mirrored counter rotating blades having overlapping paths as the mixer or blender operates. Due to the helical shape of each blade, the force acting on the food material has a vector angled upwards in relation to the mixing bowl floor. This provides a more effective mixing than traditional beater heads under the same load. The proposed design provides an advantage over the prior art as current beater designs use expensive materials and create a high load on the motor, especially under medium or high viscosity conditions. An advantage of the design described herein is the triple helix of each blade work together to achieve higher mixing performance and power efficiency. By using high strength plastics instead of metal, the design provided herein will reduce cost and provide better control of the geometry.

Referring now to the figures, FIG. 1 illustrates a perspective view of a two helical beater head or member assembly 100 according to the teachings herein that is configured to operate with a motor and motor drive as part of a beater or mixer device (not shown). In this example embodiment, beater member assembly 100 includes a first helical beater member 110 and a second helical beater member 120 configured to be in an interleaved configuration. Each of helical beater members 110 and 120 include helical blade bodies 111 and 121 having shaft members 119 and 129 (with longitudinal axes 119A and 129A) protruding upwards from top ends or cap portions 118 and 128 of the helical blade bodies 111 and 121, respectively, which are operatively coupled to a clutch system of a beater or mixer unit. In this example embodiment, beater members 110 and 120 are located adjacent each other and their respective shafts 119 and 129 are parallel to each other. The helical blade body of each of the beater members are located or positioned in an interleaving and a phase adjusted relationship to define a mixing zone between the shafts and helical blade bodies 111 and 121. For example, blade members of helical body 111 are located about 120 degrees about the shaft longitudinal axis with body 121 having a similar configuration but rotated slightly out of phase with body 111 to facilitate opposite rotation of each of the beater members. In this example embodiment, rotation of the beater members, via each of their shafts, in opposite directions forms the mixing zone between the beater members. In a related embodiment, a single helical beater member is used in a single beater arrangement as a mixer or whisk attachment.

In this example embodiment, first and second helical beater members have mirrored configurations such that their helical blade bodies include helical blade members 112/122, blades 114/124 and blades 116/126 terminating at a top or cap end 118/128 of each helical body member, blades being located equidistant from each other. Each of the beater members includes a base portion or bottom end 117/127 in which the various blades are secured and terminate at bottom. In this example embodiment, each of the helical blades has a spiraled configuration that extends from the cap portion to the base portion and each of the helical blades has the spiral angled configured in the same direction. In this example embodiment, the angled direction of the spiraled configuration is one of a clockwise or counterclockwise direction, depending on the mixing or blending application.

In this example embodiment, beater head assembly 100 uses two mirrored counter rotating triple helixes 110 and 120 that overlap paths as they rotate towards each other. For example, beater member 110 rotates inwardly and counterclockwise while beater member 120 rotates outwardly and clockwise as the assembly performs its beating or mixing operation. Due to the helical shape, the force acting on the food material has a vector angled upwards in relation to a mixing bowl floor (where base portions 117 and 127 are in operative contact with such bowl floor). This provides more effective mixing than traditional beater heads under the same load.

Referring now to FIG. 2, there illustrated a side view of helical beater member 110 having helical configured blade members 112, 114 and 116. In this example embodiment, each of the helical blades has a spiraled leading surface 112A, 114A and 116A and a trailing surface 112B, 114B, 116B. In this example embodiment, the spiraled surface has a predefined width and each of the helical blades has a predefined thickness, each configurable for the type of mixing desired. Each of the helical blade members 112, 114, and 116 comprises the respective leading edge 112A, 114A, and 116A and a respective trailing edge 112B, 114B, and 116B with an upward facing spiraled flat surface 112C, 114C, and 116C, respectively, in between with a predefined width and thickness so that during rotation of the blade body 111 and 121 in a select rotational direction the spiraled flat surface 112C, 114C, and 116C will urge product being mixed upward.

In a related embodiment, each of the blade members 112, 114 and 116 are configured in a helical wire arrangement, having a predetermined wire diameter, versus a blade structure as shown. In yet another embodiment, the helical blade members are combinable with wire helical members to provide another configuration. In yet another example embodiment, each of the helical blade members is configurable to include multiple spirals or undulations to enhance mixing or blending. The helical blade members are formed from, but not limited to, at least one material selected from the group consisting of plastic, metal, ceramic and silicone. The material selected also depends on the mixing or blending application.

Referring now to FIG. 3, there is illustrated a top view of a helical beater member 110 illustrating the top or cap portion 118 and an aperture 119B for the shaft member. In various example embodiments, helical blade members are formed from high impact and flex resistant plastic or lightweight stainless steel.

Referring now to another embodiment of a two beater member assembly, FIGS. 4 and 5 illustrate front and bottom views of another example embodiment of a two beater member assembly 200 having widened or thicker blade face surfaces configured to operate with a motor 201 and motor drive (not shown) as part of a beater or mixer device. In this example embodiment, beater member assembly 200 includes a first helical beater member 210 and a second helical beater member 220 configured to be in an interleaved configuration (see also FIG. 5). Each of helical beater members 210 and 220 include helical blade bodies 211 and 221 having shaft members 219 and 229 (with longitudinal axes disposed along the shafts) protruding upwards from top ends or cap portions 218 and 228 of the helical blade bodies, respectively, which are operatively coupled to a clutch or drive system of a beater or mixer unit. In this example embodiment, beater members 210 and 220 are located adjacent each other and include respective shafts 219 and 229 that are parallel to each other. The helical blade body of each of the beater members is located or positioned in an interleaving and a phase adjusted relationship to define a mixing zone between the shafts and helical blade bodies 211 and 221.

As further illustrated in FIG. 5, blade members of helical body 211 are located about 120 degrees about the shaft longitudinal axis with body 221 having a similar configuration but rotated slightly out of phase with body 211 to facilitate opposite rotation of each of the beater members (see arrows). In this example embodiment, rotation of the beater members in opposite directions forms the mixing zone between the beater members (see area between the two inner arrows). In a related embodiment, a single helical beater member, such as beater member 211 of FIG. 6, is used in a single beater arrangement as a mixer or whisk attachment.

In this example embodiment, first and second helical beater members have mirrored configurations such that their helical blade bodies include helical blade members 212/222, blades 214/224 and blades 216/226 terminating at a top or cap end 218/228 of each helical body member, blades being located equidistant from each other. Each of the beater members includes a base or bottom end 217/227 in which the various blades are secured and terminate at bottom. In short, each of the blades is secured at both ends. In this example embodiment, each of the helical blades has a spiraled configuration that extends from the cap portion to the base portion and each of the helical blades has the spiral angled configured in the same direction.

In this example embodiment, the angled direction of the spiraled configuration is one of a clockwise or counterclockwise direction, depending on the mixing or blending application. Due to the helical shape, the force acting on the food material has a vector angled upwards in relation to a mixing bowl floor (where 217 and 227 are in operative contact with such a bowl floor). This provides more effective mixing than traditional beater heads under the same load and provides for efficient mixing at slow speeds to prevent splashing. In this example embodiment, the helical-shaped blades scoop ingredients from the bottom of the mixing bowl and push them up through the mixing zone. In this example embodiment, twin beater assembly 200 can mix wet or dry ingredients of various viscosities and has an optimal operating speed of about 200 RPM to about 1000 RPM (revolutions per minute).

FIG. 6 illustrates a side view of helical beater member 211 according to the teachings herein. In this example embodiment, each of the helical blades 212, 214, and 216 has spiraled leading surfaces 212A, 214A and 216A, respectively, and a trailing surface 212B, 214B, and 216B, respectively. In this example embodiment, the spiraled surface has a widened or expanded width face (as compared to helical blade 111) and has a predefined thickness, each blade configurable for the type of mixing desired. In addition, a bottom portion opposite end 217 is pointed and is not flat as in other example embodiments of the helical blade body.

In a related embodiment, each of the blade members 112, 114 and 116, for instance, are configured in a helical wire arrangement, having a predetermined wire diameter, versus a blade structure as shown. In yet another embodiment, the helical blade members are combinable with wire helical members to provide another configuration. In yet another example embodiment, each of the helical blade members is configurable to include multiple spirals or undulations to enhance mixing or blending. The helical blade members are formed from, but not limited to, at least one material selected from the group consisting of plastic, metal, ceramic, and silicone. The material selected also depends on the mixing or blending application.

The helical beaters described herein, either individually or as a pair, are configured for use with a blending or mixing system having a motor, motor drive and gears for rotating the beaters in opposite directions to provide a cooperating configuration by which either beater can be driven in either direction, either singly or doubly, to drive the material being mixed together either upwardly or downwardly in a mixing zone of a bowl, thereby providing versatility and superior mixing actions with the robust helical beaters using adequate power transmission. Accordingly, the beater mixer system using the helical beater assembly described can mix highly viscous materials and can also knead bread dough or pie crust with no increase in motor capability requirement when used in a planetary mixer assembly. Further, the helical blades should be safe when using utensils or an inadvertent finger touches a beater blade only resulting in the helical blades driving same vertically out of contact with the blade. Moreover, the helical beater arrangement is silent in operation since the blades can stay in continuous contact with the bowl and progressively clear the wall of the bowl within every few turns of the bowl.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A beater member for use with a food mixer comprising:
   a shaft having a longitudinal axis, the shaft for connection to a drive mechanism of a food mixer; and
   a helical blade body attached to an end of the shaft at a cap portion of the helical blade body so that the shaft terminates at the cap portion of the helical blade body, the helical blade body formed from at least three helical blade members each of which has a first end connecting with the cap portion and a second end connecting with a base portion of the helical blade body for creating a mixing zone within the helical blade body, each of the helical blade members having a spiraled configuration and extending from the cap portion to the base portion, wherein each of the helical blade members have the spiral angled in the same rotational direction and the helical blade members are located equidistant from each other,
   wherein each of the helical blade members comprises a leading edge and a trailing edge with an upward facing spiraled flat surface in between with a predefined width and thickness so that during rotation of the blade body in a select rotational direction the spiraled flat surface will urge product being mixed upward, and wherein each helical blade is formed integrally with the cap portion and the base portion that together comprise a plastic material.

2. The beater member of claim 1, wherein the angled direction of the spiraled configuration is one of a clockwise or counterclockwise direction.

3. A beater member assembly comprised of two beater members of claim 1, wherein the two beater members comprise a first beater member and a second beater member that are located adjacent each other, each beater member having the shaft with each shaft being parallel to one another with each shaft terminating at the cap portion of the each helical blade body, and wherein the helical blade bodies of the first beater member and the second beater member are located in an interleaving and a phase adjusted relationship to define a mixing zone between the shafts and helical blade bodies.

4. The beater member assembly of claim 3, wherein the helical blade bodies are configured to rotate in opposite directions to form the mixing zone.

5. A combination food mixer comprising the beater member according to claim 1, the food mixer further comprising:
   a housing; and
   a motor within the housing, the beater member having an upper end of the shaft engageable within the housing operatively interconnecting the shaft and the motor to rotate the shaft.

6. The food mixer of claim 5 further comprising a plurality of the beater members including a first beater member and a second beater member that are located adjacent each other, each beater member having the shaft with the shafts being parallel to each other, and wherein the helical blade body of each of the beater members are located in an interleaving and a phase adjusted relationship to define mixing zones between the shafts and helical blade bodies.

7. The food mixer of claim 6 wherein the motor is operatively connected to each of the shafts for rotating the shafts in opposite directions to move ingredients between them in the mixing zone.

\* \* \* \* \*